(12) United States Patent
Zhang et al.

(10) Patent No.: US 11,879,541 B2
(45) Date of Patent: Jan. 23, 2024

(54) OIL SCAVENGE SYSTEM FOR A GEARBOX

(71) Applicants: General Electric Company, Schenectady, NY (US); GE Avio S.r.I., Rivalta di Torino (IT)

(72) Inventors: Xiaohua Zhang, Glenville, NY (US); Bugra H. Ertas, Niskayuna, NY (US); Flavia Turi, Turin (IT); Walter J. Smith, Ballston Spa, NY (US)

(73) Assignees: GENERAL ELECTRIC COMPANY, Schenectady, NY (US); GE AVIO S.R.L., Rivalta di Torino (IT)

( * ) Notice: Subject to any disclaimer, the term of this patent is extended or adjusted under 35 U.S.C. 154(b) by 0 days.

(21) Appl. No.: 17/657,683

(22) Filed: Apr. 1, 2022

(65) Prior Publication Data
US 2023/0313880 A1    Oct. 5, 2023

(51) Int. Cl.
*F16H 57/04* (2010.01)
*F02C 7/36* (2006.01)
*F16H 1/28* (2006.01)

(52) U.S. Cl.
CPC ............ *F16H 57/0486* (2013.01); *F02C 7/36* (2013.01); *F16H 57/0423* (2013.01); *F05D 2220/323* (2013.01); *F05D 2240/35* (2013.01); *F05D 2260/40311* (2013.01); *F16H 1/28* (2013.01); *F16H 57/0456* (2013.01)

(58) Field of Classification Search
CPC ............. F16H 57/0486; F16H 57/0423; F16H 57/0456; F16H 1/28; F16H 57/042; F16H 57/0421; F16H 57/0427; F16H 57/043; F16H 57/0431; F16H 57/0479; F16H 57/0482; F02C 7/36; F02C 7/06; F05D 2220/323; F05D 2240/35; F05D 2260/40311
USPC ..... 475/331, 159; 184/6.12, 6.13, 6.27, 11.1
See application file for complete search history.

(56) References Cited

U.S. PATENT DOCUMENTS

| 5,121,599 | A | 6/1992 | Snyder et al. |
| 5,472,383 | A | 12/1995 | McKibbin |
| 6,223,616 | B1 | 5/2001 | Sheridan |
| 9,038,779 | B2 | 5/2015 | McCune et al. |

(Continued)

FOREIGN PATENT DOCUMENTS

| EP | 3674584 B1 | 11/2021 |
| FR | 3127024 A1 | 3/2023 |

(Continued)

*Primary Examiner* — Steven M Sutherland
(74) *Attorney, Agent, or Firm* — Venable LLP; David D. Leege; Michele V. Frank

(57) ABSTRACT

A gearbox including a gear and a gutter. The gear is rotatable about a rotational axis in a rotational direction. The gear has a radial direction and an axial direction, and the gear expels oil radially outward when the gear rotates. The gutter is positioned radially outward of the gear in the radial direction of the gear to collect oil expelled by the gear when the gear rotates. The gutter includes an axial surface, a plurality of radial surfaces including a first radial surface and a second radial surface, and at least one opening to allow the oil collected in the gutter to flow therethrough. Each of the first radial surface and the second radial surface is oriented in a direction intersecting the axial surface, and the at least one opening is formed on both the axial surface and one of the first radial surface and the second radial surface.

20 Claims, 13 Drawing Sheets

(56) References Cited

U.S. PATENT DOCUMENTS

| | | | |
|---|---|---|---|
| 9,404,381 B2 | 8/2016 | NguyenLoc et al. | |
| 9,657,572 B2 | 5/2017 | McCune et al. | |
| 10,066,507 B1 | 9/2018 | Parnin | |
| 10,202,902 B2 | 2/2019 | McCune et al. | |
| 11,008,942 B2 | 5/2021 | Jacquemard et al. | |
| 11,060,417 B2 | 7/2021 | McCune | |
| 11,066,945 B2 | 7/2021 | McCune | |
| 11,067,162 B2 | 7/2021 | McCune et al. | |
| 11,085,510 B2 | 8/2021 | Pennacino et al. | |
| 11,162,421 B2 | 11/2021 | Dick et al. | |
| 2011/0061835 A1 | 3/2011 | Brun | |
| 2013/0104232 A1* | 4/2013 | Johnson | H04W 12/12 726/23 |
| 2016/0146102 A1* | 5/2016 | McCune | F02C 3/107 415/122.1 |
| 2021/0071540 A1 | 3/2021 | Labbe et al. | |
| 2021/0222767 A1 | 7/2021 | Jabido et al. | |

FOREIGN PATENT DOCUMENTS

| | | |
|---|---|---|
| FR | 3127025 A1 | 3/2023 |
| FR | 3129436 A1 | 5/2023 |
| FR | 3129690 A1 | 6/2023 |
| FR | 3130747 A1 | 6/2023 |
| FR | 3130875 A1 | 6/2023 |
| GB | 369875 A | 3/1932 |

\* cited by examiner

FIG. 5

OIL SCAVENGE SYSTEM FOR A GEARBOX

TECHNICAL FIELD

The present disclosure relates to a gearbox and, more particularly, to an oil scavenge system for an epicyclical gear train, such as epicyclical gear trains used in gas turbine engines for aircraft.

BACKGROUND

Oil is used in power gearboxes, including gearboxes having an epicyclical gear train, to lubricate gears and bearings in the gearbox. In an epicyclical gear train, oil may be supplied to lubricate the mesh between the gears. As the gears of the epicyclical gear train rotate during operation, the oil is expelled outwardly by inertial (or centrifugal) forces. The oil may be collected by a gutter located radially outward of the gears.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

FIG. 5 is a table schematically illustrating the axial flow of oil for different apex directions of the gears used in the gearbox shown in FIG. 3.

FIG. 6A is a perspective view of the local gutter with the planet gears and a sun gear shown in broken lines. FIG. 6B shows the position of the local gutter in the gearbox shown in FIG. 3. FIG. 6C is a schematic of the local gutter positioned over the planet gear.

FIG. 7A is a perspective view of the local gutter with the planet gears and a sun gear shown in broken lines. FIG. 7B shows the position of the local gutter in the gearbox shown in FIG. 3. FIG. 7C is a schematic of the local gutter positioned over the planet gear.

DETAILED DESCRIPTION

Features, advantages, and embodiments of the present disclosure are set forth or apparent from a consideration of the following detailed description, drawings, and claims. Moreover, it is to be understood that the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As noted above, oil used to lubricate the gears of an epicyclical gear train may be expelled radially outward. The epicyclical gear may include a sun gear and planet gears. In some embodiments, the planet gears rotate individually about an axis and collectively about the sun gear. As discussed further below, the planet gears may be bihelical gears that expel the oil in an axial direction of the planet gear. A local oil gutter is positioned in the carrier of the planet gears to collect the oil expelled from the planet gears. This local gutter includes openings that are positioned in a way that accounts for the axial movement of the oil from the bihelical planet gears to efficiently remove the oil to avoid oil accumulation which may result in higher windage loss or oil churning in extreme cases. A global gutter that circumscribes the gears of the epicyclical gear train may have similarly designed openings as the local gutter to collect oil expelled from the collective rotation of the planet gears.

Figure 1:
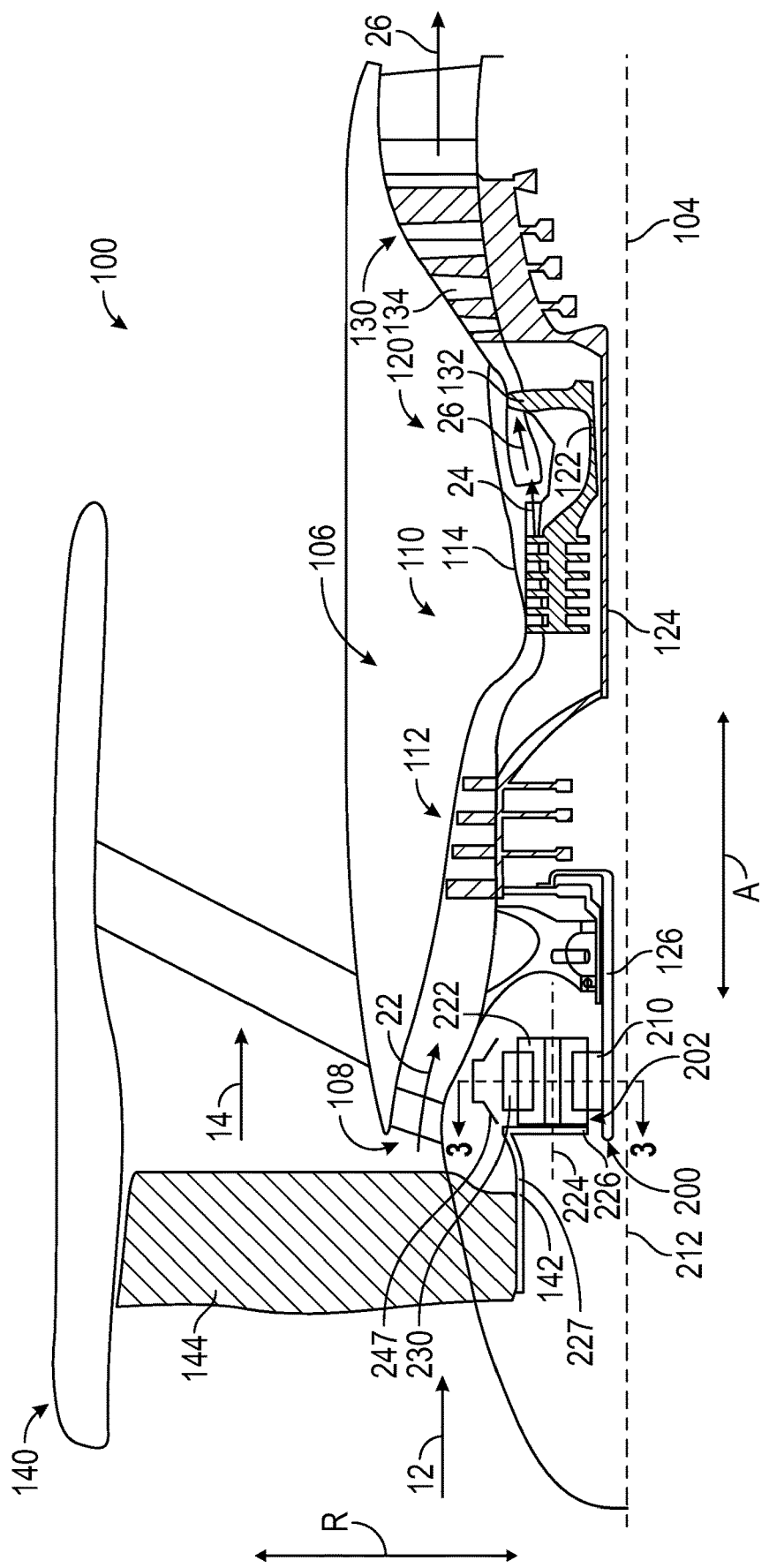
FIG. 1 is a cross-sectional view of a turbofan engine that uses a gearbox, according to an embodiment of the present disclosure.
Figure 2:
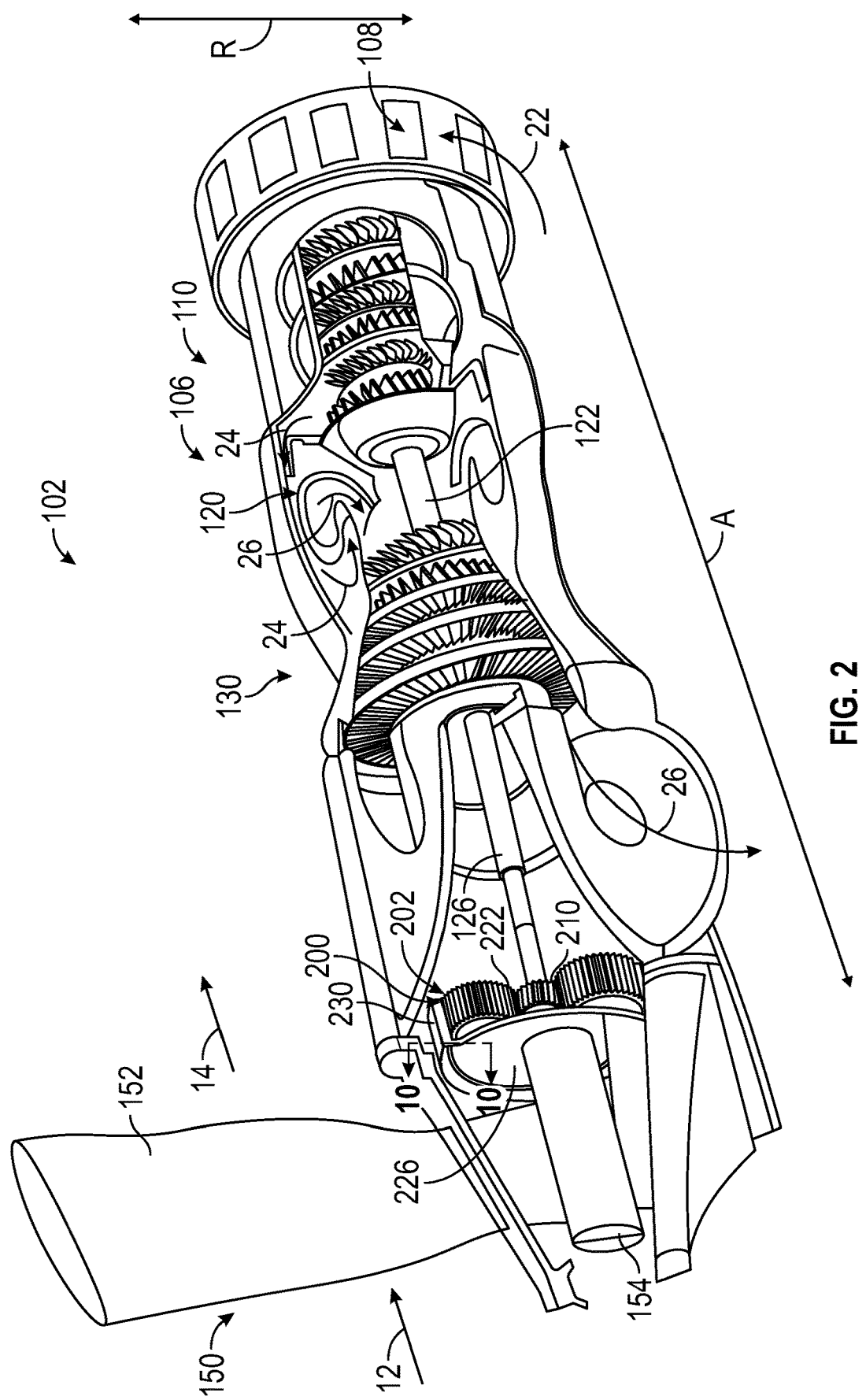
FIG. 2 illustrates a cutaway view of a turboprop engine that uses a gearbox, according to an embodiment of the present disclosure.

The gutter designs discussed herein are suitable for use in gearboxes used in the engines of aircraft and, in particular, gas turbine engines. FIGS. 1 and 2 illustrate two gas turbine engines that may be used for propulsion of an aircraft. The gas turbine engine shown in FIG. 1 is a high-bypass turbofan engine 100. The gas turbine engine shown in FIG. 2 is a turboprop engine 102. Both of the turbofan engine 100 and the turboprop engine 102 include a gearbox 200 having gutter arrangements according to the present disclosure, as will be discussed further below. Although the description below refers to the turbofan engine 100 and/or the turboprop engine 102, the present disclosure is also applicable to wind turbines and turbo-machinery, in general, including, e.g., propfan gas turbine engines, turbojet gas turbine engines, and turboshaft gas turbine engines, including marine turbine engines, industrial turbine engines, and auxiliary power units. Moreover, the gutter arrangements discussed herein may be used in any suitable gearbox, including those having an epicyclical gear train.

As shown in FIG. 1, the turbofan engine 100 has an axial direction A (extending parallel to a longitudinal centerline 104), a radial direction R, and a circumferential direction. The circumferential direction (not depicted in FIG. 1) extends in a direction rotating about the longitudinal centerline 104. The turbofan engine 100 may include an engine core 106 (also referred to as a turbomachine) and a fan assembly 140. The engine core 106 may generally include, in serial flow arrangement, a compressor section 110, a combustion section 120, and a turbine section 130. The compressor section 110 may define one or more compressors, such as, for example, a low-pressure compressor 112 and a high-pressure compressor 114. The turbine section 130 may define one or more turbines, such as, e.g., a high-pressure turbine 132 and a low-pressure turbine 134. In various embodiments, the compressor section 110 may further include an intermediate pressure compressor. In still other embodiments, the turbine section 130 may further include an intermediate pressure turbine. In wind turbine applications, the engine core 106 may generally be defined as one or more generators.

The low-pressure compressor 112 and the high-pressure compressor 114 in the compressor section 110 and the high-pressure turbine 132, and the low-pressure turbine 134 in the turbine section 130, may each include one or more rotors. In one embodiment, the rotors include one or more shafts of the turbofan engine 100 connecting the compressor section 110 to the turbine section 130. In other embodiments, the rotors generally define a disk extended at least partially in the radial direction R and a plurality of airfoils connected in a circumferentially adjacent arrangement and extended outward in the radial direction R from the disk. In one embodiment, the one or more rotors may each be connected together. For example, each rotor of the turbine section 130 or the compressor section 110 may be connected by mechanical fasteners, such as, e.g., bolts, nuts, screws, and/or rivets, or by a bonding process, such as, e.g., welding, friction bonding, diffusion bonding, etc. In various embodiments, one or more compressors of the compressor section 110 may be drivingly connected and rotatable with one or more turbines of the turbine section 130, by way of the one or more shafts. For example, the rotors of the low-pressure compressor 112 may be connected to and driven by the rotors of the low-pressure turbine 134, by a low-pressure shaft 122, and the rotors of the high-pressure compressor 114 may be connected to and driven by the rotors of the high-pressure turbine 132, by a high-pressure shaft 124.

The fan assembly 140 generally includes a fan rotor 142. The fan rotor 142 includes a plurality of blades 144 that are coupled to and extend outwardly from the fan rotor 142 in the radial direction R. In the embodiment shown in FIG. 1, the fan rotor 142 may extend in the axial direction A toward a forward end from a reduction gearbox or a power gearbox 200 (herein referred to as "gearbox 200"). The fan assembly 140 further includes a coupling shaft 126 coupled to the gearbox 200 and extended toward an aft end of the turbofan engine 100. The coupling shaft 126 may couple the engine core 106 to the gearbox 200. In FIG. 1, an outer casing of the gearbox 200 is omitted for clarity.

Figure 3:
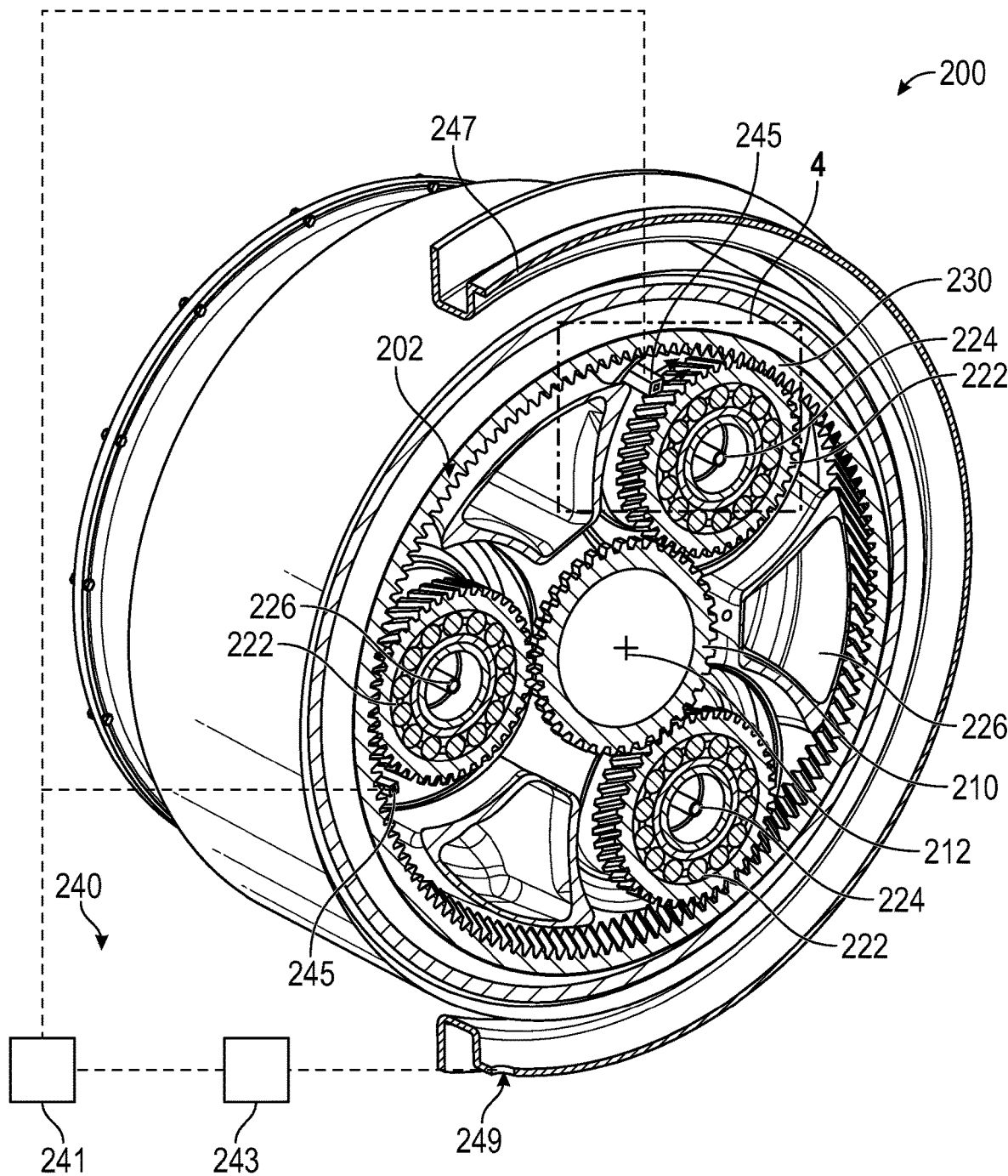
FIG. 3 is a perspective, cross-sectional view of the gearbox shown in FIG. 1, taken along line 3-3 in FIG. 1.

As shown in FIGS. 1 and 3, the gearbox 200 of this embodiment includes an epicyclical gear train 202, including a sun gear 210 and a plurality of planet gears 222. The sun gear 210 is axially installed onto and concentric to the coupling shaft 126, such that the sun gear 210 is attached to, or integral to, the coupling shaft 126. As will be discussed further below, the sun gear 210 is driven by the engine core 106 (receives a torque from the engine core 106) to rotate about a rotational axis 212, which, in this embodiment, is coincident with the longitudinal centerline 104. The sun gear 210 includes a plurality of teeth that engage (or mesh with) a plurality of teeth formed on each of the plurality of planet gears 222. A ring gear 230 (or annular gear) engages with the plurality of planet gears 222 and surrounds the plurality of planet gears 222. More specifically, the ring gear 230 includes a plurality of teeth that engage (or mesh with) a plurality of teeth formed on each of the plurality of planet gears 222.

In this embodiment, the ring gear 230 is stationary. The plurality of planet gears 222 rotate, not only about a rotational axis 224 for each planet gear 222, but the plurality of planet gears 222 also collectively rotate about the rotational axis 212 of the sun gear 210. The planet gears 222 are rotatably connected to a carrier 226, and the carrier 226 rotates about the rotational axis 212 of the sun gear 210 as the plurality of planet gears 222 collectively rotate. The plurality of planet gears 222 may be rotatably connected to the carrier 226 by various bearings (e.g., rollers, balls, or other bearing types, e.g., a journal bearing). The carrier 226 further connects to an output element 227 to allow for rotation, and the transfer of power and torque from the sun gear 210 through the plurality of planet gears 222. For example, the carrier 226 may be coupled to or otherwise integral with the fan rotor 142. Each planet gear 222 of the plurality of planet gears 222 engages with the sun gear 210 to be rotated by the sun gear 210. Each planet gear 222 is configured to receive power and torque from the sun gear 210.

In other embodiments, the plurality of planet gears 222 may each be fixed such that the rotational axis 224 of each planet gear 222 is fixed relative to the sun gear 210. In such an arrangement, the ring gear 230 rotates about the rotational axis 212 of the sun gear 210, and the ring gear 230 connects to the output element 227, such as the fan rotor 142, to allow for rotation, and transfer of power and torque from the sun gear 210 through the plurality of planet gears 222. The ring gear 230 engages with each planet gear 222 of the plurality of planet gears 222 to be rotated by the plurality of planet gears 222. The ring gear 230 is configured to receive power and torque from the plurality of planet gears 222. In various embodiments, the gearbox 200 may further include additional planet gears disposed radially between the plurality of planet gears 222 and the sun gear 210, or between the plurality of planet gears 222 and the ring gear 230. The various gears may be various suitable gear designs, such as helical gears and, in the case of the planet gears 222, may include step gears.

As shown in FIG. 1, the coupling shaft 126 is connected to the engine core 106 to transmit torque and power from the engine core 106 to the sun gear 210, and through the epicyclical gear train 202 to the fan rotor 142. The fan rotor 142 may be connected to carrier 226 or the ring gear 230 to receive torque from the sun gear 210, and to transfer torque to drive the fan assembly 140. As power is transmitted from the engine core 106, the gearbox 200 provides torque at an output speed to the fan rotor 142 that is more suitably adjusted for the fan assembly 140. For example, the gearbox 200 may reduce the speed of the fan rotor 142 relative to the engine core 106 by a factor of two or more. According to one embodiment, the gearbox 200 reduces the rotational speed from the engine core 106 (e.g., the compressor section 110 or the turbine section 130) and provides a desired amount of torque and rotational speed to the fan assembly 140.

During operation of the turbofan engine 100, a volume of air (inlet air 12), as indicated schematically by arrow 12, enters the turbofan engine 100. As the inlet air 12 passes across the fan blades 144, a portion of the air (bypass air 14), as indicated schematically by arrow 14, is directed or routed outside the engine core 106 to provide propulsion. Additionally, another portion of air, as indicated schematically by arrow 22 and referred to as core air 22, is directed or routed through an associated inlet 108 into the compressor section 110. The core air 22 is progressively compressed as it flows through the compressor section 110, such as through the low-pressure compressor 112 and the high-pressure compressor 114, toward the combustion section 120. The now-compressed air 24 (as indicated schematically by arrows 24) flows into the combustion section 120 where a fuel is introduced, mixed with at least a portion of the compressed air 24, and ignited to form combustion gases 26. The combustion gases 26 flow into the turbine section 130, causing rotary members of the turbine section 130 to rotate, and to support operation of respectively coupled rotary members in the compressor section 110 and/or the fan assembly 140, as discussed above.

As noted above, FIG. 2 shows a turboprop engine 102 that may be equipped with the gearbox 200 having the gutter arrangements discussed herein. The discussion of the turbofan engine 100 shown in FIG. 1 also applies to the turboprop engine 102 shown in FIG. 2. The same reference numerals are used for the same or similar components between the turbofan engine 100 and the turboprop engine 102, and a detailed description of these components is omitted. In the arrangement shown in FIG. 2, the inlet 108 is located on the aft end of the turboprop engine 102, and the core air 22 flows in a forward direction, but other arrangements of turboprop engine 102 may be used where the inlet 108 is located on the forward end of the turboprop engine 102. Instead of a fan assembly 140 as described in FIG. 1, the turboprop engine 102 includes a propeller assembly 150. The propeller assembly 150 includes a plurality of propeller blades 152 that are coupled to and extend outwardly from a propeller shaft 154 in the radial direction R. As with the fan rotor 142 of FIG. 1, the propeller shaft 154 is connected to the gearbox 200 to receive torque and power from the engine core 106 through the epicyclical gear train 202. The propeller shaft 154 may be connected to the epicyclical gear train 202 in a manner similar to the fan rotor 142, as discussed above. In FIG. 2, the outer casing of the gearbox 200 and a global gutter are omitted for clarity.

FIG. 3 is a perspective, cross-sectional view of the gearbox 200 according to an embodiment. The cross-sectional view of FIG. 3 is taken along line 3-3 shown in FIG. 1. As discussed above, the gearbox 200 includes the epicyclical gear train 202 including the sun gear 210, the plurality of planet gears 222 rotatably connected to the carrier 226, and the ring gear 230. Oil may be used to lubricate the rotating parts of the gearbox 200, including the sun gear 210, the planet gears 222, and the ring gear 230. An oil system 240 is configured to supply oil to the gearbox 200. In this embodiment, the oil system 240 includes an oil pump 241 that draws oil from a reservoir 243 (or sump). The oil pump 241 pressurizes and drives the flow of oil to be injected by at least one oil nozzle 245. Oil may be injected downstream (in the rotation direction) of a nip formed between meshing (engaging) gears. As shown in FIG. 3, for example, the oil nozzle 245 is fluidly connected to the reservoir 244 and configured to inject oil in a nip formed between one of the planet gears 222 and the ring gear 230. In this embodiment, the nip is where the teeth of the planet gear 222 meshes with the teeth of the ring gear 230. A plurality of oil nozzles 245 may be used, such as, for example, at each of the nips formed between the planet gears 222 and the ring gear 230.

Figure 4:
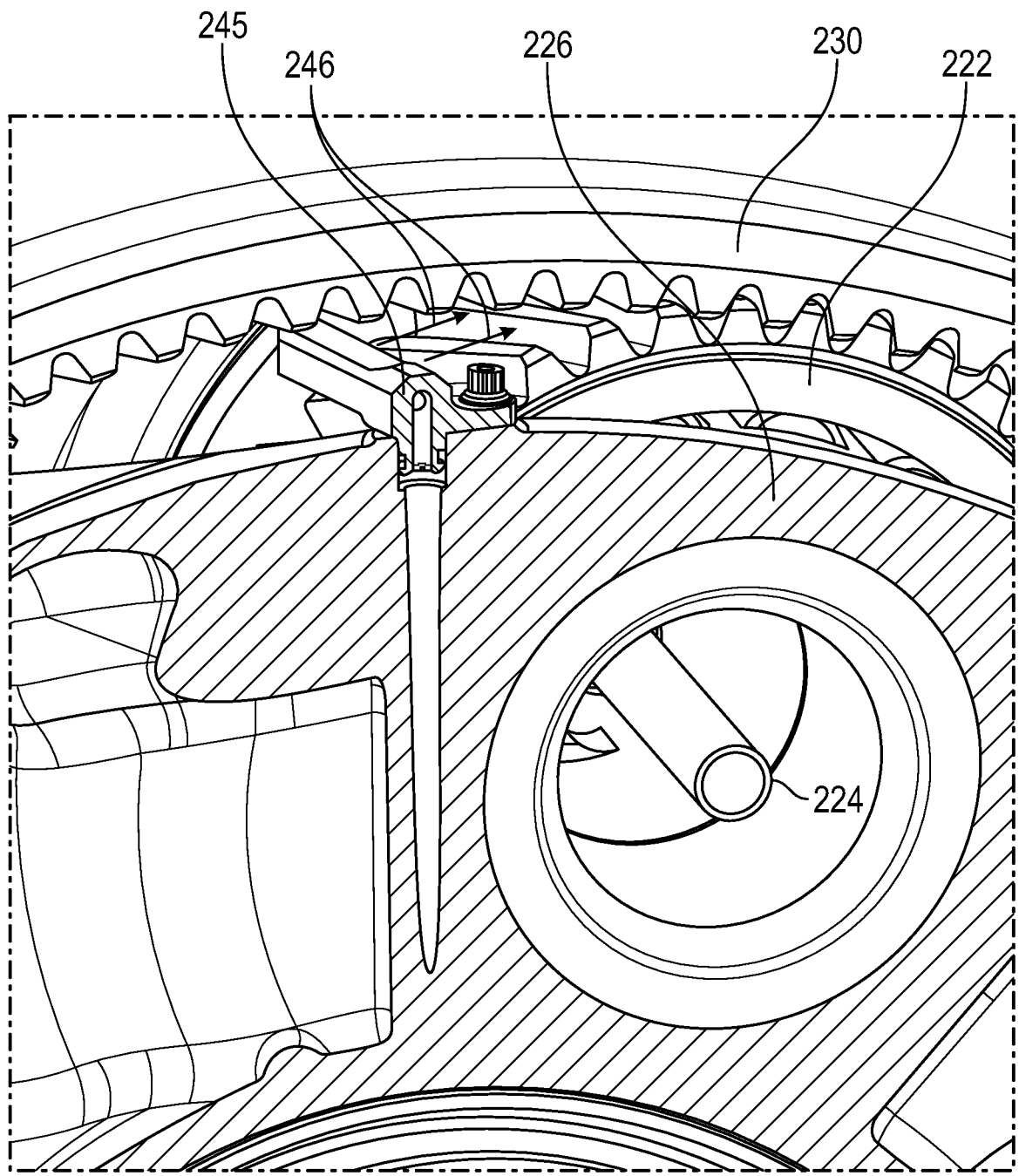
FIG. 4 is a detail view of detail 4 in FIG. 3, showing an oil nozzle for injecting oil in the gearbox shown in FIG. 3.

FIG. 4 is a detail view of detail 4 in FIG. 3 showing the oil nozzle 245 injecting oil on the converging side of the nip between one of the planet gears 222 and the ring gear 230. The oil nozzle 245 is preferably located upstream of the nip and injects oil in a direction toward the nip as indicated by the arrows labeled 246. Oil may be supplied to the epicyclical gear train 202 using other suitable supply devices and at other locations, including, for example, nips formed between the planet gears 222 and the sun gear 210.

Figure 5:
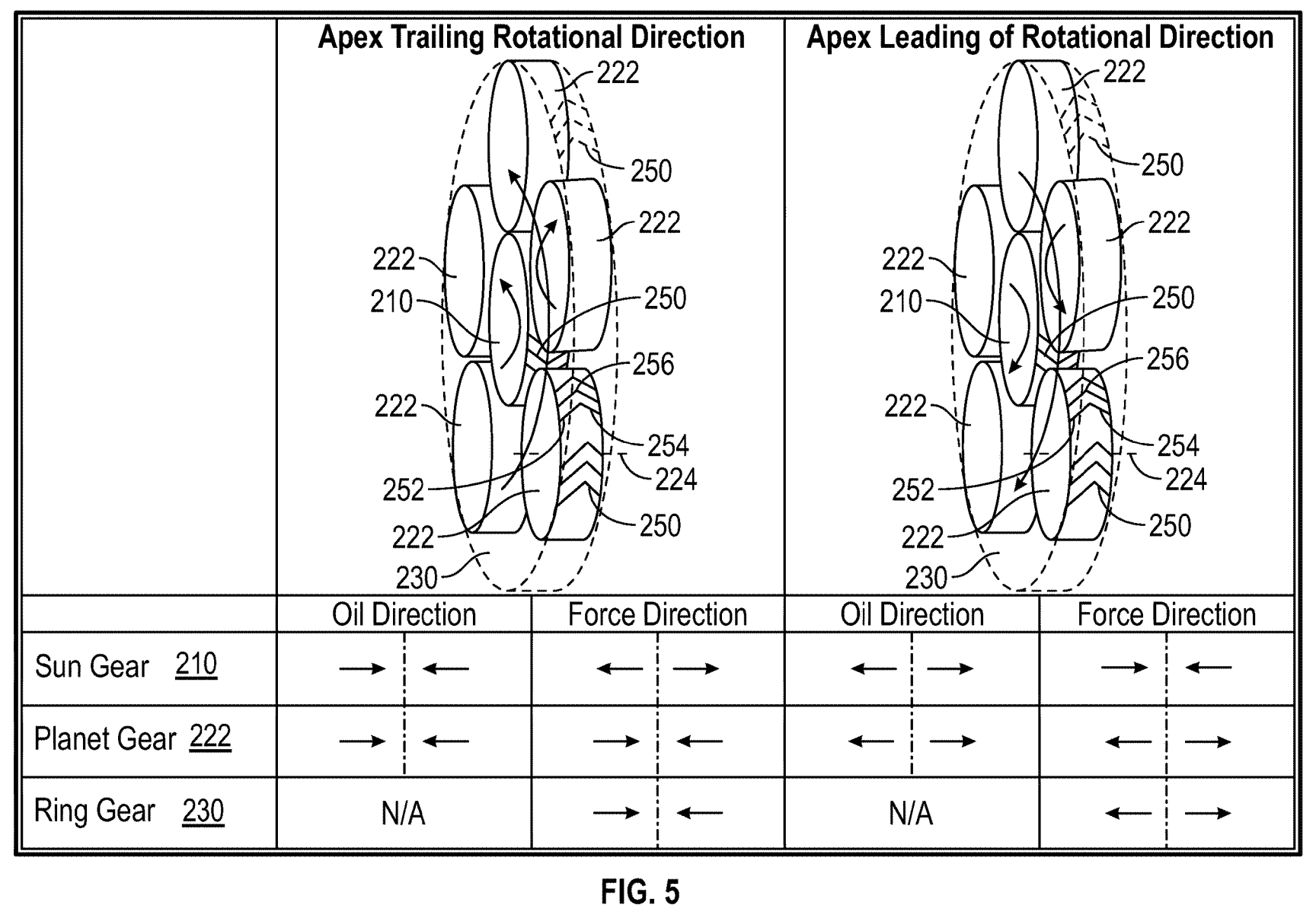

FIG. 5 is a table schematically illustrating the axial flow of oil for different apex directions of the sun gear 210 and the planet gears 222. The sun gear 210, the plurality of planet gears 222, and the ring gear 230 may be bihelical gears. The following discussion of one of the planet gears 222 applies equally to the other planet gears 222, the sun gear 210, and the ring gear 230. The planet gear 222 has an axial direction (a direction of the rotational axis 224), a radial direction, and a circumferential direction (a direction of rotation). The width of the gear is in the axial direction. The planet gear 222 includes a plurality of teeth 250, with each tooth 250 on the bihelical gear having a first portion 252 and a second portion 254. Each of the first portion 252 and the second portion 254 is angled relative to the axial direction of the gear. The angle of the first portion 252 and the second portion 254 intersects such that the first portion 252 and the second portion 254 converge at an apex 256. In some embodiments, the apex 256 may be in the center of the width of the gear. In some embodiments, the bihelical planet gear 222 may be formed by two separate helical gears that are coupled together to operate as the planet gear 222. The first portion 252 and the second portion 254 are shown as being in phase in these embodiments, but other arrangements of the bihelical gear may be used, such as the second portion 254 being angularly displaced by, for example, a half tooth circular pitch or a quarter tooth circular pitch, from the first portion 252. As the planet gear 222 rotates about the rotational axis 224, the oil is expelled radially outward by inertial (or centrifugal) forces and collected by a local gutter 260 connected to the carrier 226. In this embodiment, the local gutter 260 is integrally formed in the carrier 226 (see FIG. 8).

Because of the helical nature of these gears, the oil has an axial component, in addition to a circumferential component of travel. The table in FIG. 5 identifies the axial component of the expelled oil direction from the rotational effect of the gears, as well as the force direction acting on the two halves of the gear. The center line represents the location of the apex, which in this embodiment is the center of the bihelical gear. For example, in the oil direction column, arrows pointing towards the center line means the axial component of the expelled oil from the two halves of the bihelical gear is towards the center, while the arrows pointing away from the center line means the axial component of the expelled oil from the two halves of the bihelical gear is away from the center. The same applies to the force column—arrows pointing to the center line indicates forces on the two halves of bihelical gear act towards the middle, while arrows pointing away from the center line indicates the forces on the two halves of bihelical gear drive the two halves away. The table lists oil and force directions for the sun gear 210, the planet gears 222, and the ring gear 230 depending on the position of the apex relative to the rotational direction of the gear. As shown in FIG. 5, the oil will travel toward the apex 256 in the axial and circumferential directions of the planet gear 222 when the apex 256 is trailing the rotational direction of the planet gear 222, and the oil will travel away from the apex 256 in the axial and circumferential directions of the planet gear 222 when the apex 256 is leading the rotational direction of the planet gear 222.

Figures 6A, 6B:
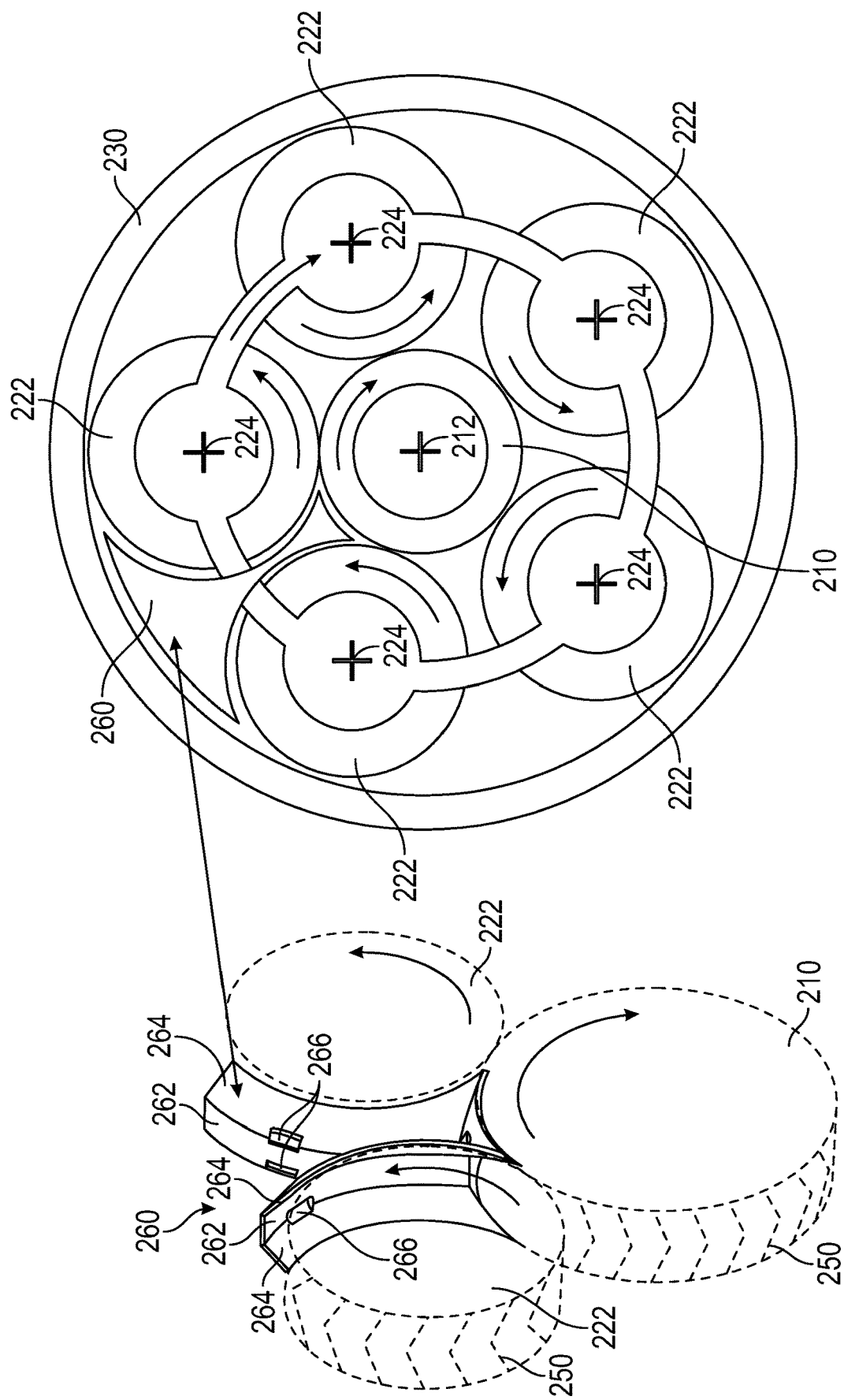
FIGS. 6A, 6B, and 6C show a configuration of a local gutter for a bihelical planet gear in the gearbox shown in FIG. 3 when the apex of the bihelical planet gear is trailing the rotational direction of the planet gear.

FIGS. 6A and 6B show a configuration of the local gutter 260 when the apex 256 is trailing the rotational direction of the planet gear 222. FIG. 6A is a perspective view of the local gutter 260 with the planet gears 222 and sun gear 210 shown in broken lines. FIG. 6B shows the position of the local gutter 260 in the epicyclical gear train 202. The local gutter 260 is mounted on the carrier 226 in close proximity to the planet gears 222 and the sun gear 210. The local gutter 260 rotates with the carrier 226. The local gutter 260 is positioned between adjacent planet gears 222 such that the local gutter 260 collects oil from each of the adjacent planet gears 222.

The local gutter 260 of this embodiment has a trapezoidal cross section, having an axial surface 262 and a plurality of radial surfaces 264. In this embodiment, the local gutter 260 includes two radial surfaces, a first radial surface and a second radial surface. The local gutter 260 may have other shapes, such as a U-shape. Although shown as a generally planar surface, the axial surface 262 and the plurality of radial surfaces 264 may have other suitable shapes, such as curved shapes, or be divided into multiple sections. The axial surface 262 of this embodiment is oriented in a direction parallel to the rotational axis 224 of the planet gear 222. Each of the radial surfaces 264 is oriented in a direction intersecting the axial surface 262. In this embodiment, each of the radial surfaces 264 forms an oblique angle with the axial surface 262 and extends outward from the axial surface 262 in the axial direction, but, in some embodiments, each of the radial surfaces 264 may be perpendicular to the axial surface 262. A plurality of openings 266 is formed on the local gutter 260 to allow the oil collected in the local gutter 260 to flow from the local gutter 260 at the openings and flow into a cavity 268 (see also FIG. 8). The shape of the local gutter 260 and the position of the openings 266 are placed for efficient removal and utilization of the oil. As noted above, the oil travels toward the apex 256 in the axial direction of the planet gear 222 when the apex 256 is trailing the rotational direction of the planet gear 222, such as in the configuration shown in FIGS. 6A and 6B. The oil has both a radial component of travel and an axial component of travel, and each opening 266 is formed both on the axial surface 262 and one of the radial surfaces 264.

Figure 6C:
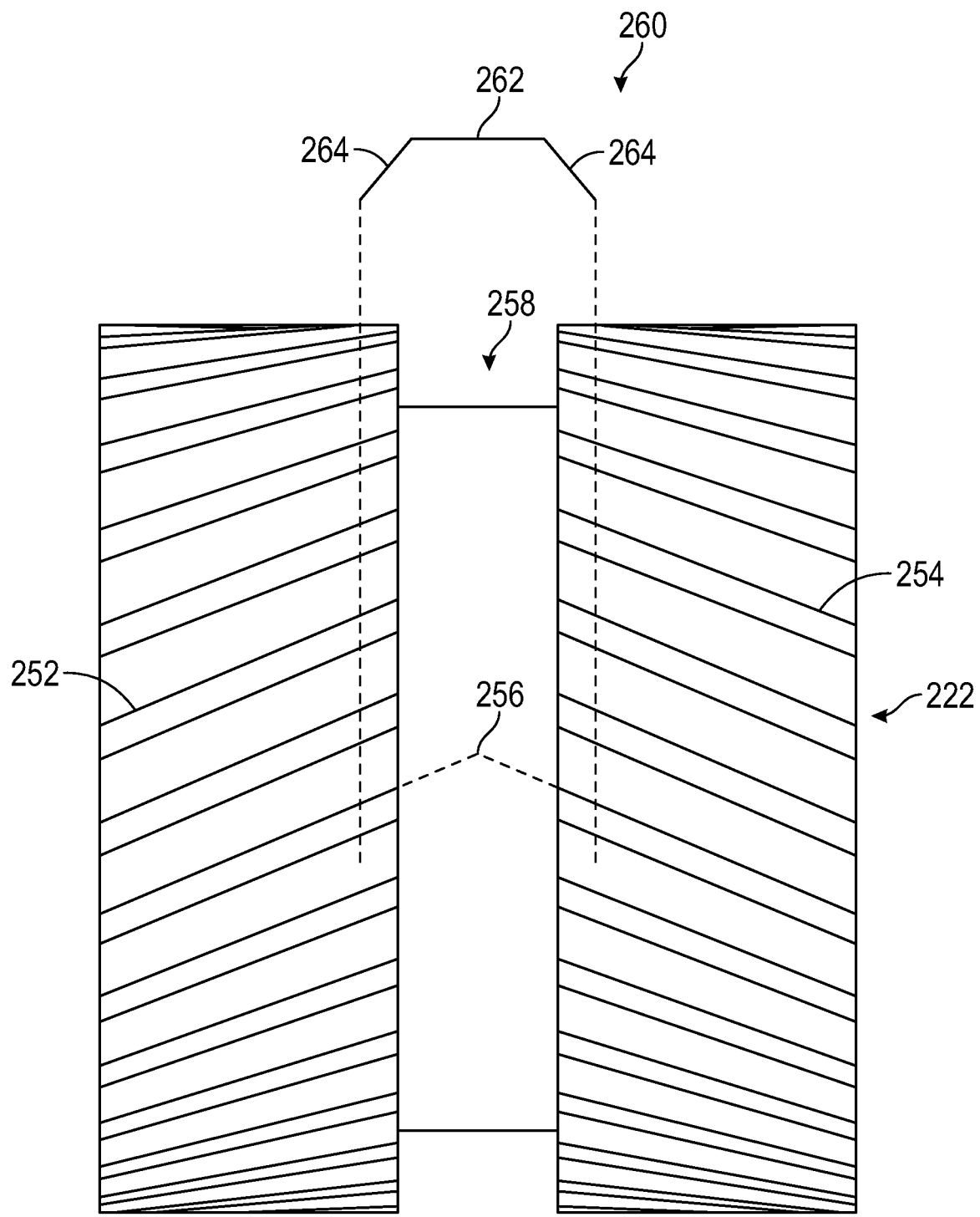

FIG. 6C is a schematic of the local gutter 260 positioned over the planet gear 222 in the arrangement shown in FIGS. 6A and 6B. Because the oil travels toward the apex 256, the width of the local gutter 260 in the axial direction does not need to be greater than the width of the planet gear 222. The bihelical planet gear 222 may have a gap 258 (or a groove) formed between the first portion 252 and the second portion 254. The edges of the local gutter 260 are positioned such that the local gutter 260 at least covers the gap 258. In this embodiment, the width of the local gutter 260 is the width of the gap 258 or greater. The axial surface 262 may also have a width that is at least the width of the gap 258 and, in some embodiments less than the width of the planet gear 222.

Figures 7A, 7B:
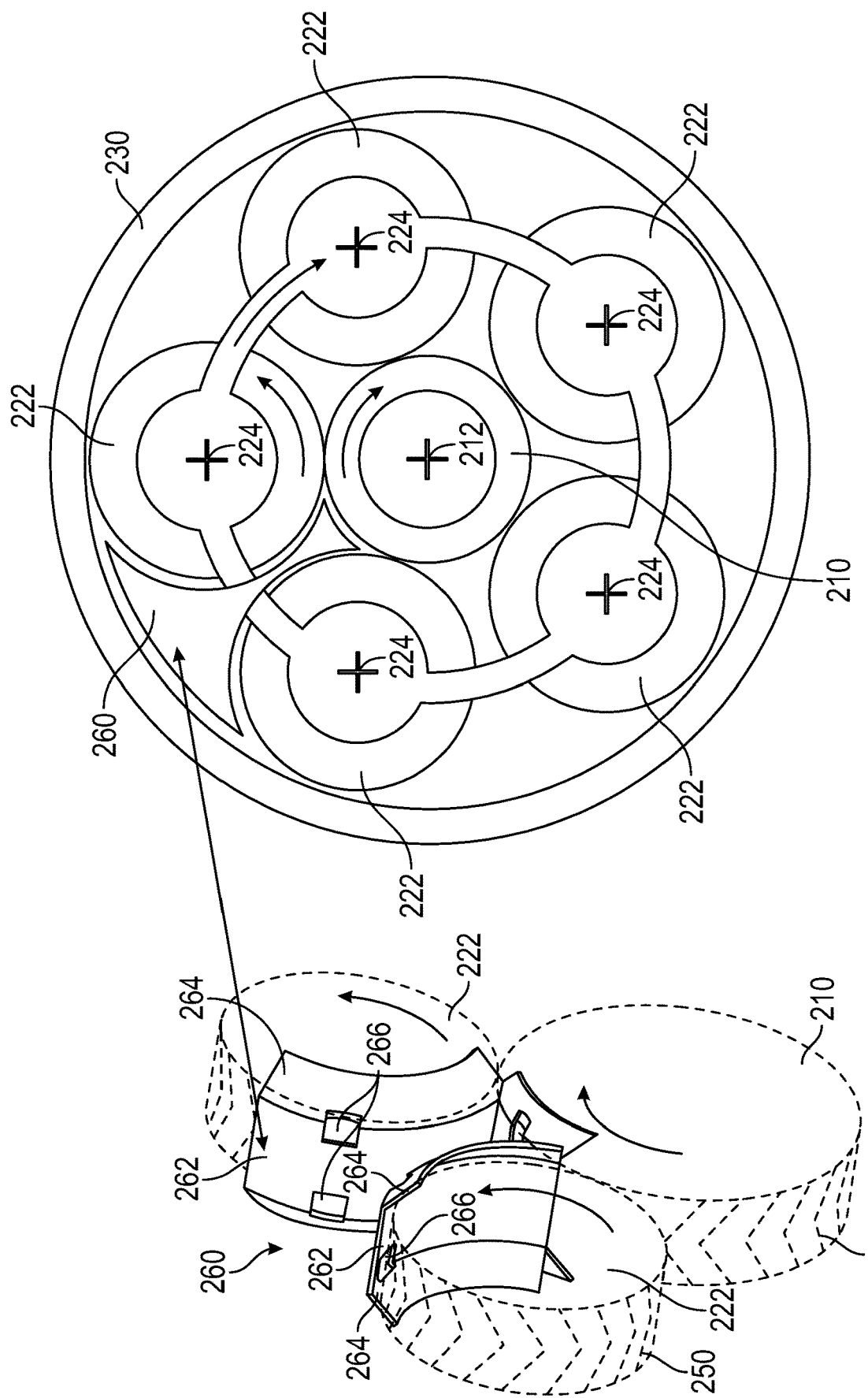
FIGS. 7A, 7B, and 7C show a configuration of the local gutter for the bihelical planet gear in the gearbox shown in FIG. 3 when the apex of the bihelical planet gear is leading the rotational direction of the planet gear.
Figure 7C:
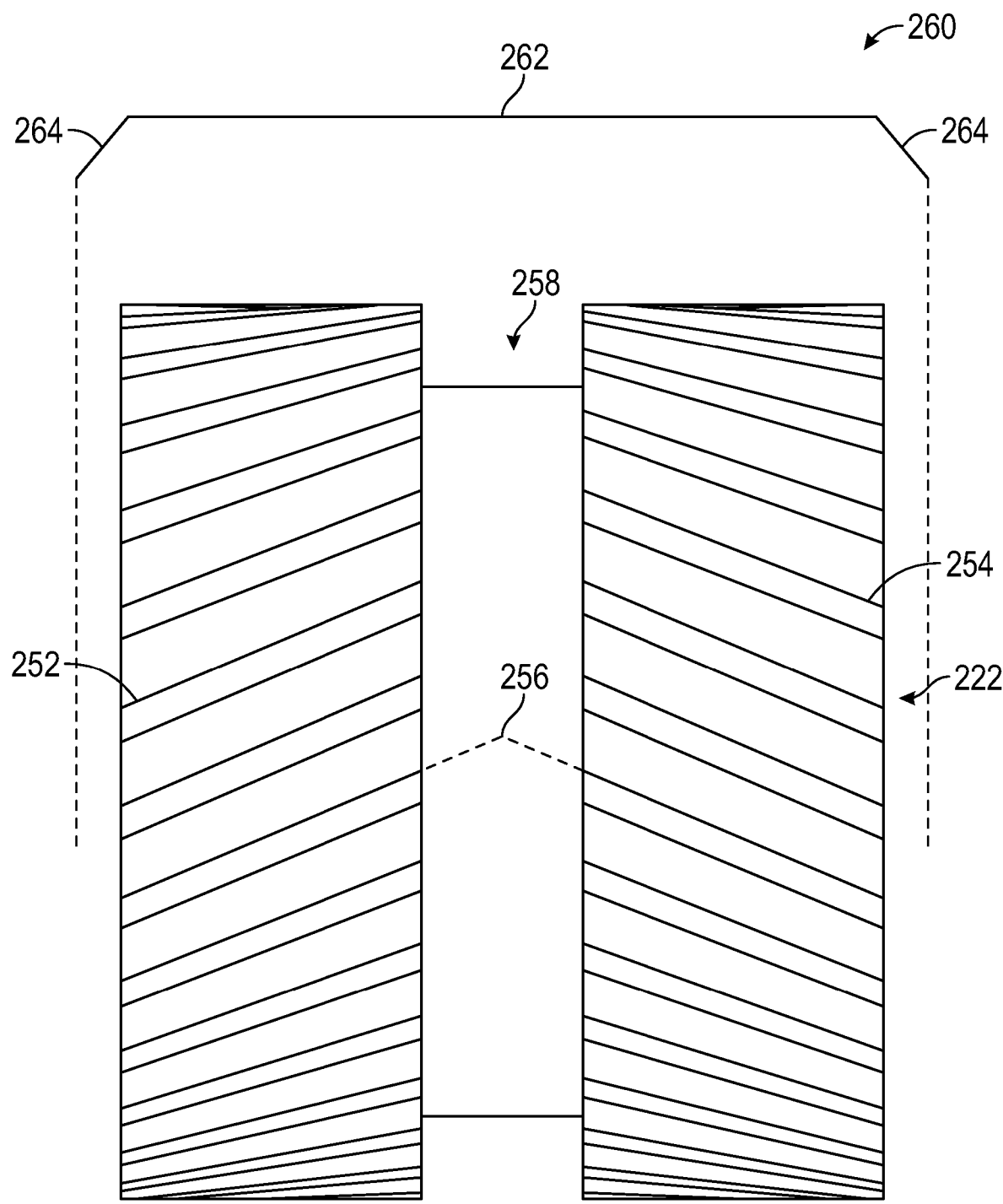

FIGS. 7A, 7B, and 7C show a configuration of the local gutter 260 when the apex 256 is leading the rotational direction of the planet gear 222. FIG. 7A is a perspective view of the local gutter 260 with the planet gears 222 and sun gear 210 shown in broken lines. FIG. 7B shows the position of the local gutter 260 in the epicyclical gear train 202. FIG. 7C is a schematic of the local gutter 260 positioned over the planet gear 222 in the arrangement shown in FIGS. 7A and 7B. The local gutter 260 has the same general shape and components as the local gutter 260 discussed above with reference to FIGS. 6A and 6B, but the sizing of the local gutter 260 is different. As noted above, the oil travels away from the apex 256 in the axial direction of the planet gear 222 when the apex 256 is leading the rotational direction of the planet gear 222. In this case, oil tends to be sprayed out axially away from the apex 256. Therefore, catching oil on both sides of the planet gear 222 is needed. In order to catch the oil spun out, the axial surface 262 covers the width of the planet gear 222, and the radial surfaces 264 extend outwardly beyond the width of the planet gear 222 to cover at least a portion of the sides. The edges of the local gutter 260 are positioned at least at the outer edges of the teeth 250 and preferably beyond the outer edges of the teeth 250. In this embodiment, the width of the local gutter 260 is at least the width of the planet gear 222 and is preferably greater than the width of the planet gear 222. In some embodiments, the width of the axial surface 262 is the same width as the planet gear 222.

Figure 8:
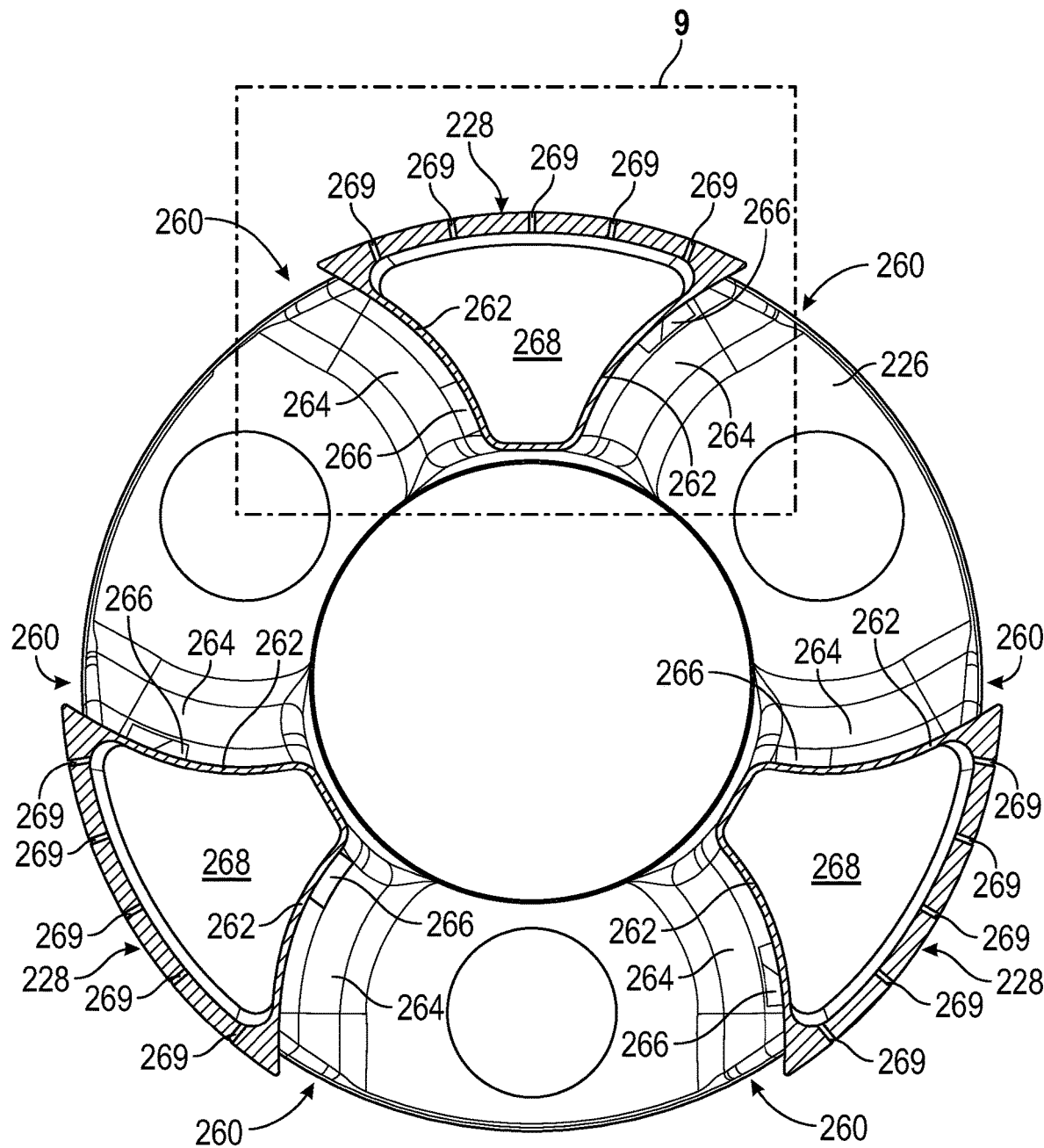
FIG. 8 is a cross-sectional view of a carrier for the planet gears in the gearbox shown in FIG. 3, taken along line 3-3 in FIG. 1.
Figure 9:
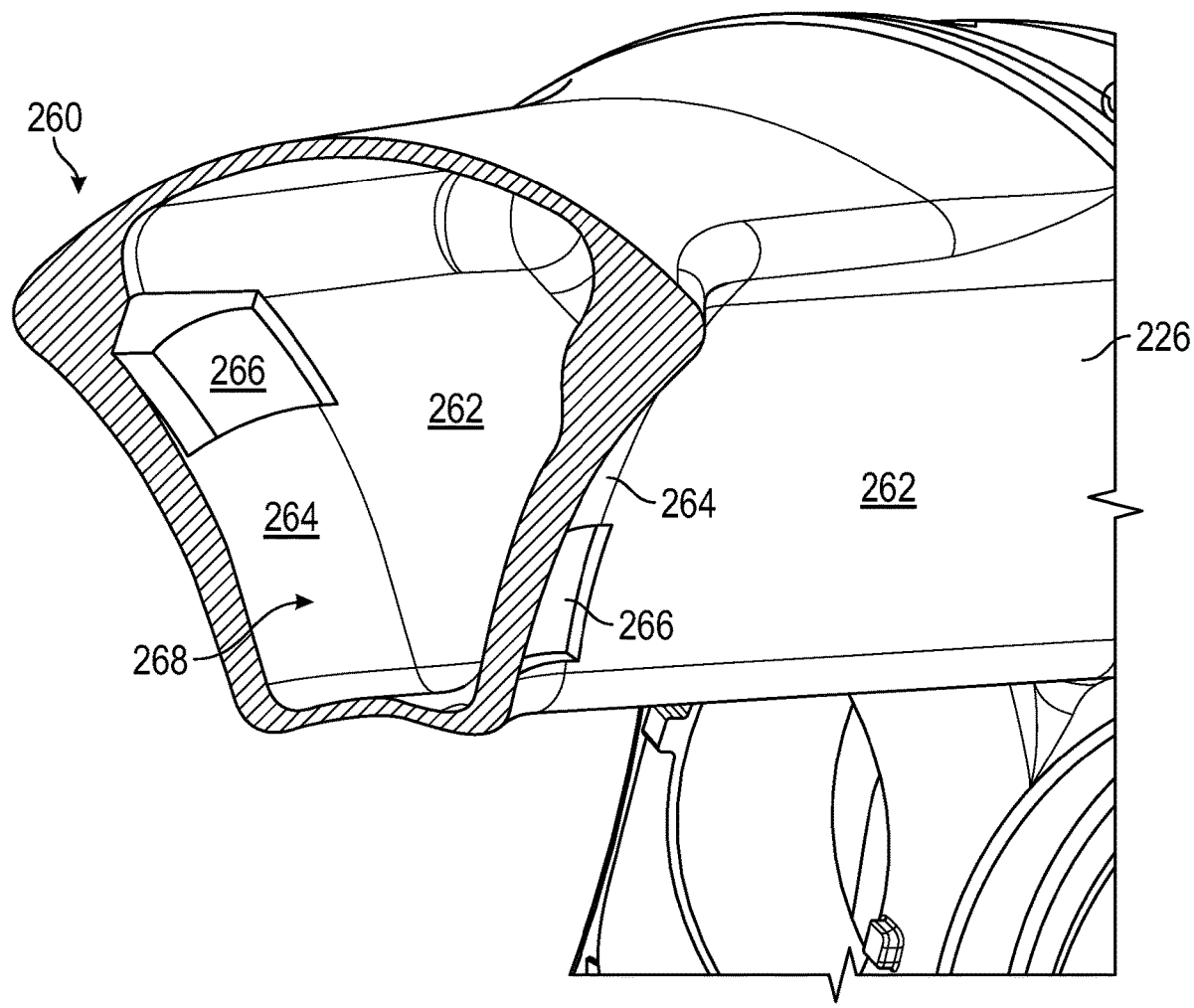
FIG. 9 is a perspective, cross-sectional view of a local gutter in the carrier, showing detail 9 in FIG. 8.

FIG. 8 is a cross-sectional view of the carrier 226, taken along line 3-3 in FIG. 1, and FIG. 9 is a perspective, cross-sectional view, showing detail 9 in FIG. 8. FIGS. 8 and 9 show the local gutter 260 in the carrier 226. As noted above, oil collected by the local gutter 260 flows out of the local gutter 260 and into a cavity 268 formed in the local gutter 260. Here, a first portion of the local gutter 260 collects oil from one planet gear 222 (see FIG. 3), and a second portion of the local gutter 260 collects oil from an adjacent planet gear 222. The cavity 268 is formed therebetween. The cavity 268 includes local gutter exits 269 (openings) formed on a surface 228 of the carrier 226 that faces the ring gear 230 (see FIG. 3). As the carrier 226 rotates, the oil is expelled outwardly through the local gutter exit 269 by inertial (or centrifugal) forces and is collected by a global gutter 247 (FIG. 3).

As shown in FIG. 3, in some embodiments, the global gutter 247 circumscribes the gears of the epicyclical gear train 202, such that the global gutter 247 is located radially outward of the carrier 226. The global gutter 247 is shown as having a U-shape in this embodiment, but the global gutter 247 may have any shape suitable for collecting the oil therein. The global gutter 247 includes a scavenge port 249. The oil collected in the global gutter 247 may be removed at the scavenge port 249. The scavenge port 249 is located on a bottom portion of the global gutter 247 so that gravity may assist in the flow of oil to the scavenge port 249. The scavenge port 249 is fluidly connected to the reservoir 243, and the oil is scavenged from the global gutter 247 through the scavenge port 249 and returned to the reservoir 243. The reservoir 243, thus, is configured to receive oil from the scavenge port 249.

Figure 10:
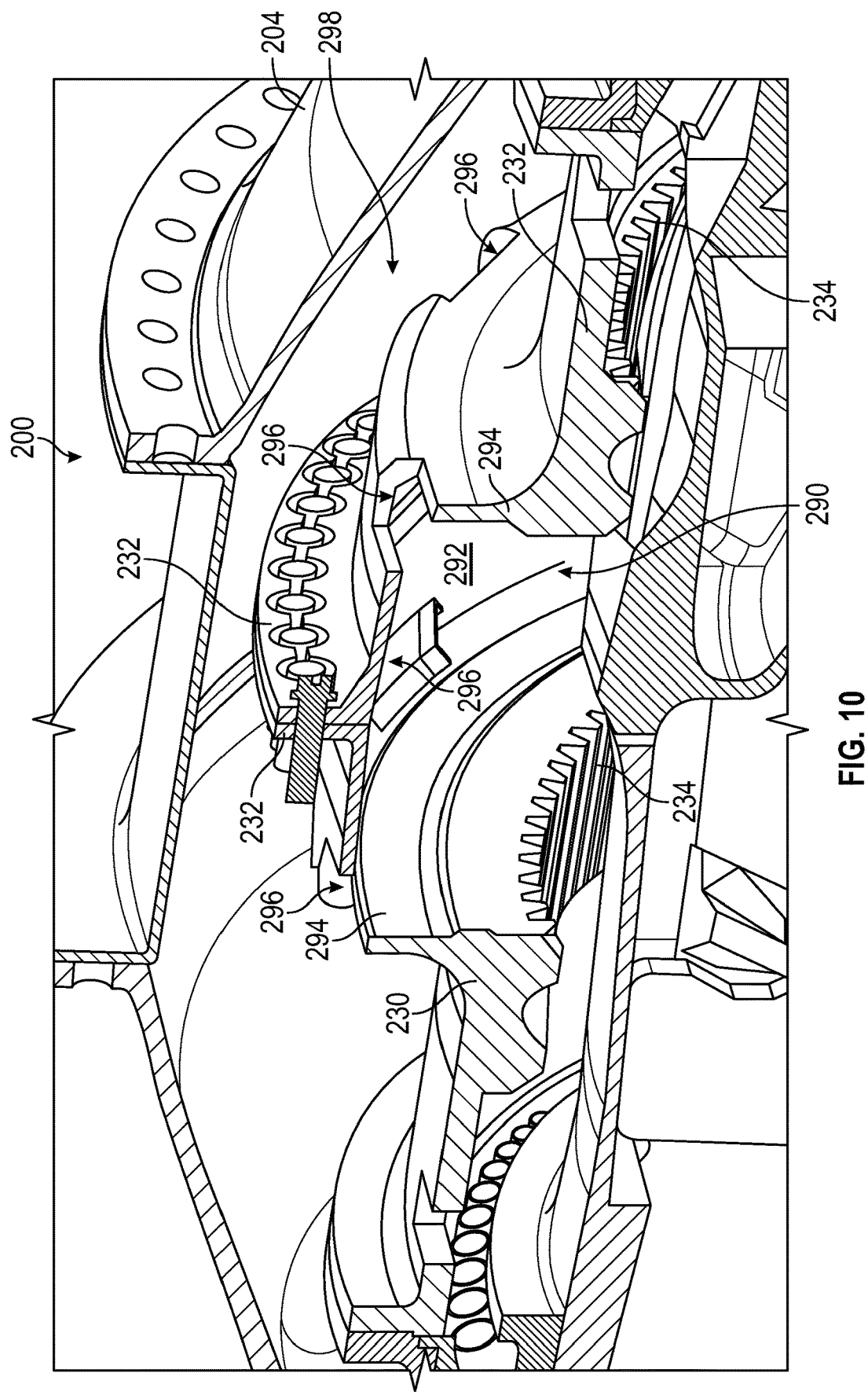
FIG. 10 is a perspective, cross-sectional view of an upper portion of the gearbox shown in FIG. 3, taken along line 10-10 in FIG. 2, with a global gutter formed as part of a ring gear.
Figure 11:
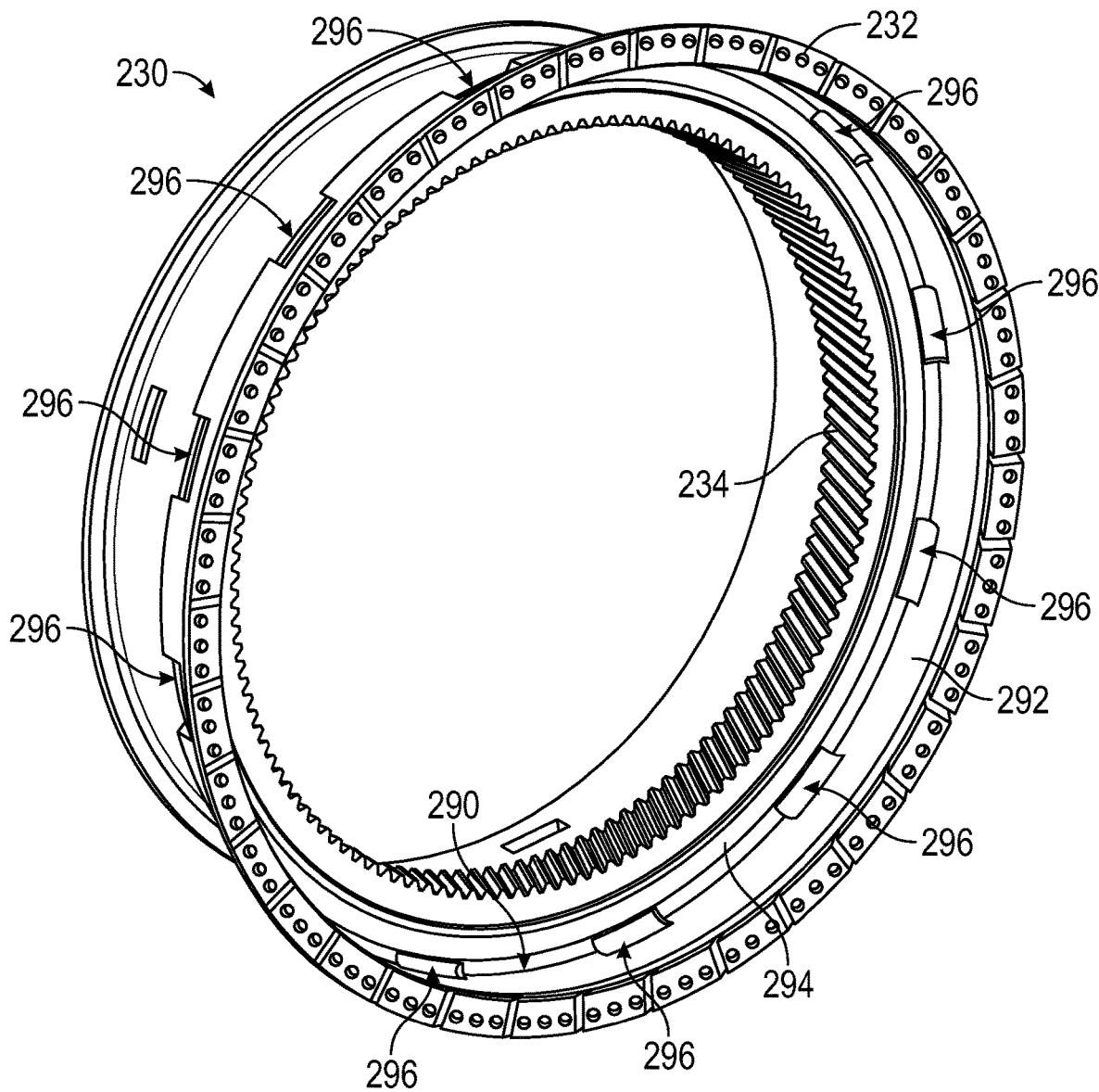
FIG. 11 is a perspective view of half of the ring gear shown in FIG. 10.

FIG. 10 is a perspective, cross-sectional view of an upper portion of the gearbox 200, taken along line 10-10 in FIG. 2, and FIG. 11 is a perspective view of one half of the ring gear 230 shown in FIG. 10. As noted above, the ring gear 230 may be stationary and, in this embodiment, has an integrated global gutter 290. The integrated global gutter 290 is integrally formed in the ring gear 230. The ring gear 230 of this embodiment is formed by two halves in the axial direction. Each half includes a flange 232, and the flanges 232 of each half are fastened to each other by a suitable fastener, such as a bolt.

Each half also includes a plurality of teeth 234. As shown in FIG. 10, the integrated global gutter 290 is formed between the teeth 234 of each half when the ring gear 230 is assembled. The integrated global gutter 290 of this embodiment has a U-shape with an axial surface 292 and two radial surfaces 294. A plurality of openings 296 is also formed in the integrated global gutter 290. As with the openings 266 of the local gutter 260 discussed above, the openings 296 of the integrated global gutter 290 are strategically placed, and each opening 296 is formed both on the axial surface 292 and one of the radial surfaces 294. The openings 296 allow the oil collected in the integrated global gutter 290 to flow from the integrated global gutter 290 at the openings and into a cavity 298 formed between the ring gear 230 and an outer casing 204 of the gearbox 200. In such a configuration, a scavenge port (not shown), generally similar to the scavenge port 249 of FIG. 3, may be formed in the outer casing 204. The scavenge port is located on a bottom portion of the outer casing 204 so that gravity may assist in the flow of oil to the scavenge port 249.

Further aspects of the present disclosure are provided by the subject matter of the following clauses.

A gearbox including an oil system, at least one gear, and at least one gutter. The oil system is configured to supply oil to the gearbox. The gear rotates about a rotational axis in a rotational direction. The gear has a radial direction and an axial direction. The gear expels oil radially outward when the gear rotates. The gutter is positioned radially outward of the gear in the radial direction of the gear to collect oil expelled by the gear when the gear rotates. The gutter includes an axial surface, a plurality of radial surfaces, and at least one opening. The plurality of radial surfaces includes a first radial surface and a second radial surface. Each of the first radial surface and the second radial surface is oriented in a direction intersecting the axial surface. The at least one opening allows the oil collected in the gutter to flow therethrough. The at least one opening is formed on both the axial surface and one of the first radial surface and the second radial surface.

The gearbox of the preceding clause, further including a plurality of openings. Each of the openings is formed on both the axial surface and one of the first radial surface and the second radial surface.

The gearbox of any preceding clause, wherein the gutter has a trapezoidal shape. Each of the first radial surface and the second radial surface forms an oblique angle with the axial surface.

The gearbox of any preceding clause, wherein the first radial surface and the second radial surface extend outward from the axial surface in the axial direction.

The gearbox of any preceding clause, wherein the gear is a bihelical gear having a plurality of teeth. Each tooth of the plurality of teeth includes a first portion and a second portion. The first portion and the second portion are angled relative to the axial direction of the gear to converge at an apex.

The gearbox of any preceding clause, wherein the gear includes a gap between the first portion and the second portion. The apex trails the rotational direction of the gear. The axial surface of the at least one gutter has a width that is greater than the gap in between the first portion and the second portion.

The gearbox of any preceding clause, wherein the apex is leading the rotational direction of the gear. The width of the gutter is greater than the width of the gear.

The gearbox of any preceding clause, further including an epicyclical gear train and a plurality of the at least one gutter. The epicyclical gear train includes a plurality of the at least one gear and a sun gear. The plurality of the at least one gear is a plurality of planet gears. The sun gear is configured to receive a torque and rotate about an axis of rotation. The sun gear engages with each planet gear of the plurality of planet gears to rotate each planet gear. The ring gear engages with each planet gear of the plurality of planet gears. Each gutter of the plurality of the at least one gutter is a local gutter.

The gearbox of any preceding clause, wherein each local gutter is positioned between adjacent planet gears such that the local gutter collects oil from each of the adjacent planet gears. The first portion of the local gutter collects oil from one planet gear. The second portion of the local gutter collects oil from an adjacent planet gear.

The gearbox of any preceding clause, wherein each local gutter further includes a cavity formed between the first portion of the local gutter and the second portion of the local gutter. The opening is fluidly connected to the cavity.

The gearbox of any preceding clause, further including a carrier. The planet gears are rotatably connected to the carrier, wherein the plurality of planet gears is collectively rotatable about the rotational axis of the sun gear. The carrier rotates about the rotational axis of the sun gear as the plurality of planet gears collectively rotate.

A gearbox including an epicyclical gear train, a plurality of local gutters, and a global gutter. The epicyclical gear train includes a sun gear, a plurality of planet gears, a carrier, and a ring gear. The sun gear is configured to receive a torque and rotate about a rotational axis. Each planet gear engages with the sun gear to be rotated by the sun gear. The plurality of planet gears is collectively rotatable about the rotational axis of the sun gear. The planet gears are rotatably connected to the carrier. The carrier rotates about the rotational axis of the sun gear as the plurality of planet gears collectively rotate. The ring gear engages with each planet gear of the plurality of planet gears. The oil system is configured to supply oil to the gearbox. Each local gutter is positioned radially outward of a planet gear in the radial direction of the planet gear to collect oil expelled by the planet gear when the planet gear rotates. The plurality of local gutters are connected to the carrier to collectively rotate with the carrier. The global gutter circumscribes the plurality of planet gears, such that the global gutter is located radially outward of the plurality of planet gears to collect oil expelled by the plurality of local gutters when the plurality of local gutters rotate.

The gearbox of any preceding clause, wherein each local gutter is formed in the carrier.

The gearbox of any preceding clause, wherein each local gutter further includes a cavity and at least one local gutter exit fluidly connected to the cavity. The oil is expelled outwardly through the local gutter exit when the carrier rotates.

The gearbox of any preceding clause, wherein the global gutter is integrally formed in the ring gear.

The gearbox of any preceding clause, wherein each local gutter is positioned between adjacent planet gears such that the local gutter collects oil from each of the adjacent planet gears. The first portion of the local gutter collects oil from one planet gear. The second portion of the local gutter collects oil from an adjacent planet gear.

The gearbox of any preceding clause, wherein each local gutter further includes at least one opening and a cavity. At least one opening to allow the oil collected in the local gutter to flow therethrough. The cavity is formed between the first portion of the local gutter and the second portion of the local gutter. The opening is fluidly connected to the cavity.

A gas turbine engine includes a core, an output element, and the gearbox of any preceding clause. The core includes a compression section, a combustion section, and a turbine section. The gearbox is coupled to the core to transmit torque and power from the core to the output element.

The gas turbine engine of any preceding clause, further including a fan. The fan includes a fan rotor and a plurality of fan blades extending radially outward from the fan rotor. The fan rotor is the output element.

The gas turbine engine of any preceding clause, further including a propeller assembly. The propeller assembly includes a propeller shaft and a plurality of propeller blades extending outwardly from the propeller shaft. The propeller shaft is the output element.

Although the foregoing description is directed to the preferred embodiments, other variations and modifications will be apparent to those skilled in the art and may be made without departing from the spirit or the scope of the disclosure. Moreover, features described in connection with one embodiment may be used in conjunction with other embodiments, even if not explicitly stated above.

The invention claimed is:

1. A gearbox comprising:
an oil system configured to supply oil to the gearbox;
at least one gear rotatable about a rotational axis in a rotational direction, the at least one gear having a radial direction and an axial direction, the at least one gear expelling oil radially outward when the at least one gear rotates; and
at least one gutter positioned radially outward of the at least one gear in the radial direction of the at least one gear to collect oil expelled by the at least one gear when the at least one gear rotates, the gutter including:
an axial surface;
a plurality of radial surfaces including a first radial surface and a second radial surface, each of the first radial surface and the second radial surface being oriented in a direction intersecting the axial surface; and
at least one opening to allow the oil collected in the gutter to flow therethrough, the at least one opening being formed on both the axial surface and one of the first radial surface and the second radial surface.

2. The gearbox of claim 1, further comprising a plurality of openings, each opening of the plurality of openings being formed on both the axial surface, and one of the first radial surface and the second radial surface.

3. The gearbox of claim 1, wherein the gutter has a trapezoidal shape, and each of the first radial surface and the second radial surface forming an oblique angle with the axial surface.

4. The gearbox of claim 3, wherein the first radial surface and the second radial surface extend outward from the axial surface in the axial direction.

5. The gearbox of claim 1, wherein the at least one gear is a bihelical gear having a plurality of teeth, each tooth of the plurality of teeth including a first portion and a second portion, the first portion and the second portion being angled relative to the axial direction of the at least one gear to converge at an apex.

6. The gearbox of claim 5, wherein the bihelical gear includes a gap between the first portion and the second portion, and the apex is trailing the rotational direction of the bihelical gear, and
wherein the axial surface of the at least one gutter has a width that is greater than the gap in between the first portion and the second portion.

7. The gearbox of claim 5, wherein the apex is leading the rotational direction of the bihelical gear, and the width of the gutter is greater than the width of the bihelical gear.

8. The gearbox of claim 1, further comprising:
an epicyclical gear train including:
a plurality of the at least one gear, the plurality of the at least one gear being a plurality of planet gears,
a sun gear configured to receive a torque and rotate about an axis of rotation, the sun gear engaging with each planet gear of the plurality of planet gears to rotate each planet gear; and
a ring gear engaging with each planet gear of the plurality of planet gears; and
a plurality of the at least one gutter, each gutter of the plurality of the at least one gutter being a local gutter.

9. The gearbox of claim 8, wherein each local gutter is positioned between adjacent planet gears such that the local gutter collects oil from each of the adjacent planet gears, a first portion of the local gutter collecting oil from one planet gear, and a second portion of the local gutter collecting oil from an adjacent planet gear.

10. The gearbox of claim 9, wherein each local gutter further includes a cavity formed between the first portion of the local gutter and the second portion of the local gutter, the opening being fluidly connected to the cavity.

11. The gearbox of claim 9, further comprising a carrier, the planet gears being rotatably connected to the carrier, wherein the plurality of planet gears is collectively rotatable about the rotational axis of the sun gear and the carrier rotates about the rotational axis of the sun gear as the plurality of planet gears collectively rotate.

12. A gas turbine engine comprising:
a core including a compression section, a combustion section, and a turbine section;
an output element; and
the gearbox of claim 1, wherein the gearbox is coupled to the core to transmit torque and power from the core to the output element.

13. The gas turbine engine of claim 12, further comprising a fan including a fan rotor and a plurality of fan blades extending radially outward from the fan rotor, the fan rotor being the output element.

14. The gas turbine engine of claim 12, further comprising a propeller assembly including a propeller shaft and a plurality of propeller blades extending outwardly from the propeller shaft, the propeller shaft being the output element.

15. A gearbox comprising:
an epicyclical gear train comprising:
a sun gear configured to receive a torque and rotate about a rotational axis;
a plurality of planet gears, each planet gear of the plurality of planet gears engaging with the sun gear to be rotated by the sun gear, the plurality of planet gears being collectively rotatable about the rotational axis of the sun gear;
a carrier, the plurality of planet gears being rotatably connected to the carrier, the carrier rotating about the rotational axis of the sun gear as the plurality of planet gears collectively rotate; and
a ring gear engaging with each planet gear of the plurality of planet gears;
an oil system configured to supply oil to the gearbox;
a plurality of local gutters, each local gutter being positioned radially outward of a planet gear of the plurality of planet gears in the radial direction of the planet gear to collect oil expelled by the planet gear when the planet gear rotates, the plurality of local gutters being connected to the carrier to collectively rotate with the carrier; and
a global gutter circumscribing the plurality of planet gears, such that the global gutter is located radially outward of the plurality of planet gears to collect oil expelled by the plurality of local gutters when the plurality of local gutters rotate, the global gutter including:
an axial surface;
a plurality of radial surfaces including a first radial surface and a second radial surface, each of the first radial surface and the second radial surface being oriented in a direction intersecting the axial surface; and at least one opening to allow the oil collected in the global gutter to flow therethrough, the at least one opening being formed on both the axial surface and one of the first radial surface and the second radial surface.

16. The gearbox of claim 15, wherein each local gutter is formed in the carrier.

17. The gearbox of claim 15, wherein each local gutter of the plurality of local gutters further includes a cavity and at least one local gutter exit fluidly connected to the cavity, oil being expelled outwardly through the local gutter exit when the carrier rotates.

18. The gearbox of claim 15, wherein the global gutter is integrally formed in the ring gear.

19. The gearbox of claim 15, wherein each local gutter is positioned between adjacent planet gears such that the local gutter collects oil from each of the adjacent planet gears, a first portion of the local gutter collecting oil from one planet gear, and a second portion of the local gutter collecting oil from an adjacent planet gear.

20. The gearbox of claim 19, wherein each local gutter further includes:
at least one opening to allow the oil collected in the local gutter to flow therethrough; and a cavity formed between the first portion of the local gutter and the second portion of the local gutter, the at least one opening being fluidly connected to the cavity.

\* \* \* \* \*